United States Patent
Frick et al.

(10) Patent No.: US 11,365,310 B2
(45) Date of Patent: Jun. 21, 2022

(54) THERMALLY EXPANDABLE COMPOSITION WITH REDUCED ODOR FORMATION

(71) Applicant: SIKA TECHNOLOGY AG, Baar (CH)

(72) Inventors: Karsten Frick, Remetschwil (CH); Sascha Pasula, Thalwil (CH); Alina Keller, Thalwil (CH); Leslie Wolschleger, Clarkston, MI (US); Elizabeth Farhat, Grosse Point Park, MI (US)

(73) Assignee: SIKA TECHNOLOGY AG, Baar (CH)

( * ) Notice: Subject to any disclaimer, the term of this patent is extended or adjusted under 35 U.S.C. 154(b) by 21 days.

(21) Appl. No.: 16/960,120

(22) PCT Filed: Dec. 20, 2018

(86) PCT No.: PCT/EP2018/086120
§ 371 (c)(1),
(2) Date: Jul. 6, 2020

(87) PCT Pub. No.: WO2019/134842
PCT Pub. Date: Jul. 11, 2019

(65) Prior Publication Data
US 2021/0061981 A1     Mar. 4, 2021

(30) Foreign Application Priority Data
Jan. 3, 2018   (EP) .................... 18150159

(51) Int. Cl.
C08J 9/10        (2006.01)
C08L 23/08       (2006.01)
C08J 9/00        (2006.01)

(52) U.S. Cl.
CPC ......... *C08L 23/0853* (2013.01); *C08J 9/0052* (2013.01); *C08J 9/0066* (2013.01); *C08J 9/103* (2013.01); *C08J 2201/026* (2013.01); *C08J 2203/04* (2013.01); *C08J 2323/08* (2013.01); *C08L 2205/03* (2013.01)

(58) Field of Classification Search
CPC ..... C08L 23/0853; C08L 23/08; C08J 9/0052; C08J 9/0066; C08J 9/103; C08J 2201/026; C08J 2203/04; C08J 2323/08; C08J 2205/03; C08K 3/22; C08K 5/14
See application file for complete search history.

(56) References Cited

U.S. PATENT DOCUMENTS

| | | | |
|---|---|---|---|
| 10,669,422 B2 | 6/2020 | Kusunoki et al. | |
| 2017/0002164 A1 | 1/2017 | Kohlstrung et al. | |

FOREIGN PATENT DOCUMENTS

| | | | | |
|---|---|---|---|---|
| DE | 102011080223 A1 | 2/2013 | | |
| WO | 2006/039428 A1 | 4/2006 | | |
| WO | 2013/017536 A1 | 2/2013 | | |
| WO | WO-2016005536 A1 * | 1/2016 | ............... | C08K 5/14 |

OTHER PUBLICATIONS

Feb. 4, 2019 International Search Report issued in International Patent Application No. PCT/EP2018/086120.
Feb. 4, 2019 Written Opinion issued in International Patent Application No. PCT/EP2018/086120.

* cited by examiner

*Primary Examiner* — Kara B Boyle
(74) *Attorney, Agent, or Firm* — Oliff PLC

(57) ABSTRACT

A thermally expandable composition includes at least one polymer P cross-linkable by peroxide, and at least one acrylate, and at least one peroxide, azodicarbonamide and a zinc compound. The thermally expandable composition leads to low odor formation and low ammonia emission during and after the foaming process. The thermally expandable composition further shows excellent properties in terms of expansion stability.

15 Claims, No Drawings

THERMALLY EXPANDABLE COMPOSITION WITH REDUCED ODOR FORMATION

TECHNICAL FIELD

The present invention relates to a thermally expandable composition, comprising at least one acrylate and at least one peroxide, as well as a baffle and/or reinforcement element for hollow structures comprising such a thermally expandable composition and a process for manufacturing such a baffle and/or reinforcement element.

BACKGROUND OF THE INVENTION

Manufactured products often contain orifices and cavities or other hollow parts that result from the manufacturing process and/or that are designed into the product for various purposes, such as weight reduction. Automotive vehicles, for example, include several such orifices and cavities throughout the vehicle, including in the vehicle's structural pillars and in the sheet metal of the vehicle doors. It is often desirable to seal such orifices and cavities so as to minimise noise, vibrations, fumes, dirt, water, humidity, and the like from passing from one area to another within the vehicle by means of sealing members or baffle elements built into the orifice or cavity. Likewise, such members or elements often fulfil an additional task of reinforcing the hollow structure of the manufactured product, e.g. automotive part, so much that it becomes more resistant to mechanical stress but still maintains the low weight advantage of the hollow structure.

Such elements used for sealing, baffling or reinforcing often consist of a carrier, made of plastic, metal, or another rigid material, and one or more layers of a thermoplastic material attached to it which is able to expand its volume when heat or another physical or chemical form of energy is applied, but they can also be entirely made of expandable material. Using an adequate design, it is possible to insert the baffle or reinforcement element into the hollow part of the structure during the manufacturing process but also to leave the inner walls of the structure still accessible (or the cavities passable) by e.g. a liquid. For example, during the manufacture process of a vehicle, the hollow parts of a metal frame can still be largely covered by an electro-coating liquid while the baffle or reinforcement elements are already inserted, and afterwards during a heat treatment step, the expandable thermoplastic material of the baffle or reinforcement element expands to fill the cavities as intended.

The development of such baffles or reinforcement elements has led to highly advanced systems, where the expandable material is able to increase its volume by up to 1500% or more, forming a foam-like structure that fills the cavities and adhering to the walls of the structure intended to be sealed, baffled, or reinforced. Especially in automotive manufacturing, this has led to considerable weight reduction and excellent dampening of noise or vibrations in the car body.

Currently employed thermally expandable compositions often consist of polymers that can be cross-linked by peroxides, such as ethylene-vinyl acetate polymers, in combination with comparably small, highly functional acrylates which are incorporated into the cross-linked network upon curing. These compositions furthermore contain blowing agents. Under activation conditions, such as elevated temperature, curing of the cross-linkable network takes place, while simultaneously the blowing agent decomposes and releases gases. This leads to the above mentioned volume expansion and the formation of a stable foam which in ideal cases fills the cavity as intended and adheres to its walls. Such a system is for example disclosed in DE 10 2011 080 223 A1.

Thermally expandable compositions crosslinked by acrylates and peroxide using azodicarbonamide as a blowing agent can have the disadvantage of odor formation since azodicarbonamide is potential emitter of ammonia when exposed to higher temperature. Especially in the automotive industry, many manufacturers rely on the test method VDA 270 to determine the odor of materials used and demand for low-odor materials.

It is thus desirable to obtain a thermally expandable composition containing azodicarbonamide as a blowing agent that does not suffer from these limitations and leads to low odor formation and low ammonia emission during and after the foaming process.

SUMMARY OF THE INVENTION

It is an object of the present invention to provide a thermally expandable composition that does not suffer from these limitations and leads to low odor formation and low ammonia emission during and after the foaming process.

Surprisingly, the present invention provides a solution to that problem by providing a thermally expandable composition, comprising
(a) at least one polymer P, cross-linkable by peroxide, and
(b) at least one acrylate A, and
(c) at least one peroxide PE, and
(d) azodicarbonamide ADCA,
(e) zinc compound ZC.
The molar ratio of said zinc compound ZC to said peroxide PE is between 0.1 and 6.0, preferably between 0.1 and 4.0.
The molar ratio of said azodicarbonamide ADCA to said peroxide PE is between 5 and 30, preferably between 8 and 25.

The composition according to the present invention is particularly suitable to be used in a sealing, baffle or reinforcement element, for example in automotive applications. Further aspects of the present invention are subject of other independent claims. Preferred embodiments of the invention are subject of dependent claims.

DETAILED DESCRIPTION OF THE INVENTION

The unit term "wt.-%" means percentage by weight, based on the weight of the respective total composition, if not otherwise specified. The terms "weight" and "mass" are used interchangeably throughout this document.

The term "functionality" in connection with a molecule describes in this document the number of chemical functional groups per molecule. The term "polyfunctional" describes a molecule with more than 1 functional groups of a given type. For example, a polyfunctional acrylate with a functionality of 3 describes a molecule with 3 acrylate groups. The term "average functionality" is used if a mixture of molecules is present that differ slightly in individual functionality, but in average exhibit a given functionality, as it is sometimes the case with technical grade chemicals.

The term "equivalent" in connection with chemical functional groups describes in this document the mass amount of a substance that equals its equivalent weight. Normally, the equivalent weight is defined as the amount of substance that contains 1 mole of a defined functional group, such as an acrylate group or a peroxide function. The ordinarily skilled artisan in the field of polymer composition formulation uses such numbers to calculate appropriate ratios for active components, and such values are commonly provided by producers of functional chemicals, especially polymers. Accordingly, the "equivalent ratio" (EQ) of two substances is understood herein as the ratio of the equivalents of a first substance to the equivalents of the second substance in a given composition.

The term "radical" used in this document describes, as known to a person with ordinary skill in the art of chemistry, a chemical species with an unpaired valence electron. The cross-linking reactions involved in the curing or hardening of the polymer system of the present invention follow a radical mechanism.

Melt flow index (MFI) is determined by the ASTM D1238 standard method, using a capillary rheometer at 190° C. and a weight of 2.16 kg. MFI values describe the amount of polymer coming out of the capillary under pressure of the defined weight and at the defined temperature during a given time.

Volume changes on the thermally expandable material are determined using the DIN EN ISO 1183 method of density measurement (Archimedes principle) in deionised water in combination with sample mass determined by a precision balance.

The present invention comprises as a first necessary component at least one polymer P that is cross-linkable by peroxide. Principally all thermoplastic polymers or thermoplastic elastomers capable of cross-linking reactions with peroxides are suitable. The artisan skilled in the field describes polymers as "cross-linkable by peroxide" if these polymers contain functional groups, e.g. C—C double bonds, which release hydrogen atoms under influence of a radical starter, e.g. a peroxide, from their backbone or side chain, such that a radical remains that is able to radically attack other polymer chains in a subsequent step, leading to a radical chain reaction cross-linking process and ultimately to a polymer network.

Suitable polymers P include, for example, styrene-butadiene copolymers, styrene-isoprene copolymers, ethylene-vinyl acetate copolymers, ethylene-methacrylate copolymers, ethylene-ethyl acrylate copolymers, ethylene butyl acrylate copolymers, ethylene-(meth)acrylic acid copolymers, ethylene-2-ethylhexyl acrylate copolymers, ethylene-acrylic ester copolymers, polyolefinc block copolymers, and polyolefins such as polyethylene or polypropylene.

The copolymers, meaning polymers made from more than one type of monomer, can be block type copolymers or random copolymers.

Polymers P can also be further functionalised, meaning they can contain further functional groups such as hydroxyl, carboxy, anhydride, acrylate, and/or glycidylmethacrylate groups.

Preferred for the present invention is one or more polymer P with an average melt flow index (MFI) of between 1 and 200 g/10 min, preferably between 10 and 100 g/10 min, more preferably between 25 and 75 g/10 min, most preferably between 35 and 55 g/10 min.

The polymer P preferably comprises ethylene-vinyl acetate (EVA). More preferably more than 70 wt-%, more than 80 wt-%, more than 90 wt-%, more than 95 wt-%, more than 99 wt-%, of the Polymer P consists of ethylene-vinyl acetate (EVA), based on the total amount of the Polymer P.

In this case, the content of vinyl acetate monomers in EVA should be between 8 and 45 wt.-%, preferably between 15 and 30 wt.-%, based on the total weight of the EVA polymer.

In cases where more than one type of polymer is used, the individual MFI combine to an average MFI of the used polymer mixture, which has to be determined according to ASTM D1238.

The thermally expandable composition according to the present invention preferably contains said at least one polymer P with an amount of between 30 and 80 wt.-%, preferably between 40 and 70 wt.-%, more preferably between 40 and 60 wt.-%, based on the weight of the total composition.

In a preferred embodiment, more than one type of polymer is used as polymer P. It was found to be beneficial for the properties of the inventive composition to use at least two types of polymer (herein named P1 and P2) with different melt flow index (MFI), one much higher than the other. For example, an especially preferred embodiment uses a first polymer P1 with an MFI of between 100 and 200 g/10 min and a second polymer P2 with an MFI of between 0.1 and 60 g/10 min, preferably between 0.1 and 10 g/10 min, preferably with a weight ratio of the two polymers P1:P2 in the composition of 0.7 to 1.3, preferably 0.8 to 1.2.

Preferred EVA polymers include, e.g., Elvax® 150, Elvax® 240A, Elvax® 260A, Elvax® 420A (all by DuPont), or the corresponding Evatane® copolymers (by Arkema).

A second necessary component of the thermally expandable composition according to the present invention is at least one acrylate A, Preferably, the acrylate A is present with an amount of between 0.1 and 5 wt.-%, preferably between 0.2 and 2 wt.-%, more preferably between 0.3 and 0.75 wt.-%, based on the total weight of the composition.

Acrylate A preferably has a molecular weight of less than 2,500 g/mol, more preferably less than 1,000 g/mol.

Acrylate A preferably exhibits an acrylate functionality of at least 2 or 3, preferably between 2 and 6, more preferably between 3 and 5, most preferably 5. More preferably, the acrylate A comprises a polyfunctional acrylate with an acrylate functionality of at least 2 or 3, preferably between 2 and 6, more preferably between 3 and 5, most preferably 5, in an amount of more than 70 wt-%, more than 80 wt-%, more than 90 wt-%, more than 95 wt-%, more than 99 wt-%, based on the total amount of the Acrylate A.

Although polymer P (described above) can comprise acrylate functions, it is beneficial for the inventive composition that these two components are not the same chemical compound. In comparison, acrylate A is generally smaller than polymer P in terms of molecular weight and acts as cross-linker for polymer P also. Only using one of the two components would either lead to poor mechanical properties in the final product or would inhibit the formation of a stable foam structure during and after expansion.

Preferred acrylates A with a functionality of 2 include ethylene glycol dimethacrylate, diethylene glycol dimethacrylate, triethylene glycol dimethacrylate, triethylene glycol diacrylate, tripropylene glycol dimethacrylate, 1,3-butanediol dimethacrylate, 1,4-butanediol dimethacrylate, 1,10-dodecanediol dimethacrylate, 1,6-hexandieol dimethacrylate, neopentylglycol dimethacrylate, and polybutylene glycol dimethacrylate.

Preferred acrylates A with a functionality of 3 or higher include glycerol triacrylate, pentaerythritol triacrylate, pentaerythritol trimethacrylate, trimethylolpropane triacrylate, trimethylolpropane trimethacrylate, tetramethylolmethane tetraacrylate, Di-(trimethylolpropane) tetraacrylate, pentaerythritol tetraacrylate, dipentaerythritol pentaacrylate, dipentaerythritol hexaacrylate, tri(2-methacryloxyethyl)

trimellitate, tri(2-acryloxyethyl) isocyanurate, as well as their ethoxylated or propoxylated derivates.

Especially preferred acrylates A exhibit a functionality of 5, such as dipentaerythritol pentaacrylate.

Further preferred acrylates include highly functional, hyperbranched acrylates with functionalities of between 6 and 16, or higher. Examples of such preferred acrylates include hyperbranched polyester-polyacrylates, for example Sartomer® CN2303 and Sartomer® CN2305, both by Arkema.

A third necessary component of the thermally expandable composition according to the present invention is at least one peroxide PE.

The thermally expandable composition according to the present invention preferably contains said peroxide PE in an amount of between 2.5 and 5 wt.-%, preferably between 2.8 and 4.8 wt.-%, based on the total weight of the composition.

It is advantageous for the inventive composition to use a peroxide that is essentially inert at room temperature (23° C.) and exhibits an activation temperature suitable for the intended purpose. For example, if the composition is used for a baffle and/or reinforcement element in automotive manufacturing, an activation temperature of between 130 and 250° C. is preferred. Furthermore, it is advisable to select a peroxide with an activation temperature compatible with the decomposition temperature of the azodicarbonamide ADCA. If those two temperatures differ too much, it may be more difficult to obtain a thermally expandable composition with optimal performance and stability. Apart from that, other, at room temperature solid components (such as in some cases polymer P) have to be compatible with these components as well, for example in terms of softening or melting point.

Preferred peroxides for the inventive composition are organic peroxides, such as keton peroxides, diacyl peroxides, peresters, perketals, and hydroperoxides. Examples of such preferred peroxides include cumene hydroperoxide, t-butyl peroxide, bis(t-butylperoxy)-diisopropyl benzene, di(t-butylperoxy isopropyl) benzene, dicumyl peroxide, t-butylperoxy benzoate, di-alkylperoxy dicarbonate, diperoxyketals (such as 1,1-di-t-butylperoxy-3,3,5-trimethyl cyclohexane), keton peroxides (such as methyl ethyl keton peroxide), and 4,4-di-t-butylperoxy-n-butyl valerate.

Especially preferred are 3,3,5,7,7-pentamethyl-1,2,4-trioxepane, 2,5-dimethyl-2,5-di(t-butylperoxy)-3-hexyne, di-t-butyl peroxide, 2,5-dimethyl-2,5-di(t-butylperoxy) hexane, t-butyl cumyl peroxide, di(t-butylperoxy isopropyl) benzene, dicumyl peroxide, butyl-4,4-di(t-butylperoxy) valerate, t-butylperoxy-2-ethylhexyl carbonate, 1,1-di(t-butylperoxy)-3,3,5-trimethyl cyclohexane, t-butylperoxy benzoate, di(4-methylbenzoyl) peroxide, and dibenzoyl peroxide.

Most preferred peroxides for the present inventive composition include dicumyl peroxide, available for example under the trade names Perkadox® BC-40B-PD by Akzo Nobel or Peroxan® DC-40 PK by Pergan and/or di(t-butylperoxyisopropyl) benzene, available for example under the trade names Perkadox® 14-40B-PD by Akzo Nobel or Peroxan® BIB-40 P by Pergan, wherein di(t-butylperoxyisopropyl) benzene is especially preferred.

It may be advantageous for the present invention to use peroxide that is immobilised on a support material, such as silica, kaolin, and/or calcium carbonate, or other suitable materials. This approach may facilitate handling, dosage, and evenly distribution of the peroxide in the composition. Examples for such immobilised peroxide include Perkadox® BC-40B-PD by Akzo Nobel (40 wt.-% dicumyl peroxide on calcium carbonate) or Perkadox® 14-40K-PD by Akzo Nobel (40 wt.-% di(t-butylperoxyisopropyl) benzene on clay and silica). However, care has to be taken in such cases to correctly calculate the wt.-% and especially the equivalents of active substance in the composition, as in this document these values always refer to active compound, and do not include possibly present support material.

The fourth essential component of the present inventive composition is azodicarbonamide ADCA. Azodicarbonamide ADCA is a blowing agent that decomposes under influence of temperature and causes an expansion in the thermally expandable composition.

Preferably, the azodicarbonamide is included in the present inventive composition with an amount of between 1 and 15 wt.-%, preferably between 5 and 10 wt.-%, more preferably between 7 and 9.5 wt.-%, based on the total weight of the composition.

The heat required for the decomposition reaction that causes the foaming (expansion) can be applied externally or internally, the latter e.g. from an exothermic reaction.

If the present inventive thermally expandable composition finds a use in a baffle and/or reinforcement element, e.g. in automotive manufacturing, it is preferable that the activation temperature of the azodicarbonamide is in line with the manufacturing conditions of the automotive part to be baffled or reinforced. As an example, the baffle and/or reinforcement element can be inserted into a cavity of a structure that needs to be treated by an electrocoating liquid, in its unexpanded state still leaving the surface of the structure accessible, and subsequently, during the heat treatment of the automotive part (i.e. the curing procedure for the electrocoating liquid), the baffle and/or reinforcement element simultaneously (or shortly thereafter) expands to its intended final shape and at least partially closes or fills the cavity. In such a case, the expansion temperature should correspond to the temperature conditions of said heat treatment, i.e. to between 90° C. and 200° C.

Accordingly, it is advisable to select the peroxide used in the inventive composition in such a way that its activation temperature is in the same range, or slightly below the decomposition temperature of the azodicarbonamide. This ensures that the radical mechanisms leading to polymer cross-linking take place at a point which enables the formation of a stable, foam-like structure.

The molar ratio of the zinc compound ZC to the peroxide PE is between 0.1 and 6.0, preferably between 0.1 and 4.0

Compositions with a molar ratio of less than 0.1 suffer from low foam expansion at 180° C. and high odor formation. This can be seen for example in the comparison of examples Ex2 to Ex4 with the examples Ex5 to Ex9.

Compositions with a molar ratio of more than 6.0 suffer from high odor formation as well as high ammonia emission. This can be seen for example in the comparison of example Ex9 with the examples Ex5 to Ex8.

It might be beneficial if the molar ratio of the zinc compound ZC to the peroxide PE is between 0.1 and 4.0, 0.1 and 3.0, 0.1 and 2.5, 0.2 and 2.0, 0.5 and 2.0, 0.8 and 2.0, preferably between 0.8 and 1.5.

Such a molar ratio is advantageous for low odor formation. This can be seen for example in the comparison of examples Ex4 to Ex9.

It can also be beneficial if the molar ratio of the zinc compound ZC to the peroxide PE is between 0.1 and 6.0, 0.2 and 6.0, 0.5 and 6.0, 0.8 and 6.0, 1.5 and 6.0, preferably between 2.0 and 6.0. This brings the advantage of highly expanded foams at 180° C. This can be seen for example in the comparison of examples Ex4 to Ex9.

It might be further beneficial if the molar ratio of the zinc compound ZC to the peroxide PE is between 0.5 and 2.5, 0.5 and 2.0, 0.5 and 1.5, preferably between 0.8 and 1.5.

This is advantageous for obtaining highly expanded foams at 180° C. and at the same time at 200° C. as well. This can be seen for example in the comparison of examples Ex6 to Ex8.

It can also be an advantage if the molar ratio of the zinc compound ZC to the peroxide PE is between 0.1 and 2.0, preferably between 0.2 and 1.5. Such a molar ratio is advantageous for low ammonia emission. This can be seen for example in the comparison of examples Ex4 to Ex9.

The molar ratio of the azodicarbonamide ADCA to the peroxide PE is between 5 and 30, preferably between 8 and 25.

Compositions with a molar ratio of less than 5 suffer from low foam expansion. Compositions with a molar ratio of more than 30 suffer from high odor formation as well as high ammonia emission. This can be seen for example in the comparison of example Ex1 with the examples Ex5 to Ex8.

It might be beneficial if the molar ratio of azodicarbonamide ADCA to peroxide PE is between 8 and 25, 12 and 25, preferably between 6 and 25. Such a molar ratio is advantageous for obtaining highly expanded foams at 200° C. This can be seen for example in the comparison of examples Ex10 to Ex12 as well as in the comparison with Ex8 and Ex12 and Ex7 and Ex11.

It might be further beneficial if the molar ratio of azodicarbonamide ADCA to peroxide PE is between 8 and 25, 12 and 25, 16 and 25, preferably between 20 and 25. Such a molar ratio brings the advantage of obtaining highly expanded foams at 160° C. and 180° C. This can be seen for example in the comparison of examples Ex10 to Ex12.

It can also be an advantage if the molar ratio of azodicarbonamide ADCA to peroxide PE is between 8 and 25, 12 and 25, 16 and 25, preferably between 20 and 25. This is advantageous for obtaining highly expanded foams at 160° C. and 180° C. and at the same time at 200° C. as well. This can be seen for example in the comparison of examples Ex10 to Ex12.

The fifth essential component of the present inventive composition is at least one zinc compound ZC.

It is advantageous if the zinc compound ZC is selected from the group consisting of zinc oxide, zinc stearate, zinc bis(p-toluenesulphinate) and zinc bis(benzenesulphinate), most preferred zinc oxide.

The inventive thermally expandable composition preferably comprises such zinc compound ZC as an activator for the azodicarbonamide with an amount of between 0.25 and 5 wt.-%, preferably between 0.25 and 3.5 wt.-%, more preferably between 0.3 and 2 wt.-%, based on the total weight of the composition.

It might be beneficial if the molar ratio of the azodicarbonamide ADCA to the sum of peroxide PE and zinc compound ZC (ADCA:(PE+ZC)) is between 2 and 20, 3 and 15, 4 and 12, preferably between 5 and 12.

Compositions with a molar ratio of more than 20 have a high odor formation as well as a high ammonia emission.

Compositions with a molar ratio of less than 2 have low expansion rates.

The inventive thermally expandable composition preferably has a molar ratio of said zinc compound ZC to peroxide PE between 0.25 and 2, preferably between 0.3 and 1.8. This is advantageous for highly expanded foams. This can be seen for example in the comparison of examples E3, E8 and E9.

It might be further preferable if the molar ratio of the zinc compound ZC to the peroxide PE is between 0.3 and 1.8, 0.5 and 1.8, 0.8 and 1.8, 0.8 and 1.5, preferably between 0.8 and 1.2. Such a molar ratio is advantageous for highly expanded foams, especially at temperatures 155° C. and 160° C. This can be seen for example in the comparison of examples E3, E8 and E9.

Another preferable molar ratio of the zinc compound ZC to the peroxide PE is between 0.3 and 1.8, 0.3 and 1.6, 0.3 and 1.5, 0.3 and 1.2, 0.3 and 1.0, 0.3 and 0.8, preferably between 0.4 and 0.6. Such compositions have the benefit of highly expanded foams, especially at temperatures 180° C. and 200° C. This may be seen by the comparison of examples E3, E8 and E9.

Apart from the essential ingredients, the present inventive thermally expandable composition may contain other components commonly used in such compositions and known to the ordinarily skilled artisan in the field. These include, for example, fillers, colorants, dispersion aids or homogenizers, adhesion promoters, antioxidants, stabilizers, and the like.

Suitable as fillers are, e.g., ground or precipitated calcium carbonate, calcium-magnesium carbonate, talcum, gypsum, graphite, barite, silica, silicates, mica, wollastonite, carbon black, or the mixtures thereof, or the like.

Fillers are, if at all, preferably incorporated in the inventive compositions with an amount of between 1 and 15 wt.-%, based on the total weight of the composition.

Colorants or dyes, such as pigments, e.g. on the basis of carbon black, may be included in the present inventive compositions. Their amount is preferably between 0 and 1 wt.-%, based on the total weight of the composition.

Dispersion aids or homogenizers, sometimes described as wetting agents or surface-active agents, may be beneficial for the present inventive composition in order to facilitate a homogeneously mixed composition. Preferably used such compounds include hydrocarbon resins, for example Novares® TL 90 available from Rutgers, Germany, Wingtack® resins (by Cray Valley), Escorez® tackifying resins (e.g., Escorez® 1304, by ExxonMobil), and Piccotac® hydrocarbon resins (e.g., Piccotac® 1100 or Piccotac® 1100E, by Eastman). Such compounds are preferably included in the inventive compositions with an amount of between 2 and 10 wt.-%, preferably between 4 and 8 wt.-%, more preferably between 5 and 7 wt.-%, based on the total weight of the composition.

In preferred embodiments, the inventive composition also includes adhesion promoters. Preferably these substances are incorporated into the polymer network during the cross-linking reactions via functional groups similar to those present in polymer P. Suitable adhesion promoters include, for example, ethylene-glycidyl methacrylate copolymers, such as Lotader® ADX 1200S, Lotader® AX8840, Lotader® 3210, Lotader® 3410 (by Arkema) or Lotryl® copolymers (by Arkema).

Adhesion promoters are preferably used in compositions according to the present invention with an amount of between 2 and 15 wt.-%, preferably between between 4 and 10 wt.-%, more preferably between 5 and 7 wt.-%, based on the total weight of the composition.

Further potentially useful additives include antioxidants and stabilizers, commonly used in polymer-based compositions and known to the person skilled in the art of polymer-based composition formulation. Examples of suitable antioxidants and stabilizers include sterically hindered thioethers, sterically hindered aromatic amines, and/or sterically hindered phenols, such as bis(3,3-bis(4'-hydroxy-3-t-butylphenyl)butanoic acid) glycol ester. Such substances are preferably included with an amount of between 0 and 0.5 wt.-%, preferably between 0.1 and 0.3 wt.-%, based on the total weight of the composition.

The compositions according to the present inventions can be manufactured by mixing the components in any suitable mixing apparatus, e.g. in a dispersion mixer, planetary mixer, twin mixer, continuous mixer, extruder, or dual screw extruder.

It may be advantageous to heat the components before or during mixing, either by applying external heat sources or by friction generated by the mixing process itself, in order to facilitate processing of the components into a homogeneous mixture by decreasing viscosities and/or melting of individual components. However, care has to be taken, e.g. by temperature monitoring and use of cooling devices where appropriate, not to exceed the activation temperatures of the azodicarbonamide and/or peroxide. The final composition is preferably essentially solid at room temperature (23° C.), meaning that it does not visibly deform at this temperature just by means of gravity during at least 24 h.

After mixing, the resulting composition may be shaped into its desired form by, e.g., extruding, blow-moulding, pelleting, injection moulding, compression moulding, punching or stamping or any other suitable process.

The thermally expandable compositions may be produced in a substantially one-step process, involving the addition of all components in a series and/or simultaneously. However, it may also be advantageous to formulate the composition as a two-part system, or even multipart system, and mix these parts into the final composition at a later stage. Such an approach may, for example, increase shelf life of the composition in places with demanding conditions (such as extraordinarily high temperatures), optimise storage room demand and transport weight, and allow for tailor-made, modular compositions regarding different applications.

The expansion of the thermally expandable composition according to the present invention is triggered by heat. This means, both the azodicarbonamide and the peroxide component are activated by a thermal process that exceeds their respective activation temperature and exhibits a duration long enough for both processes (peroxide-initiated radical polymerisation and decomposition of the azodicarbonamide including gas formation) to proceed until the expandable material has expanded and cured into its intended final (sufficiently expanded and stable) state. The optimal temperature and duration (dwell time) depends on the azodicarbonamide and peroxide used in the inventive composition. These values are provided by the manufacturers of such components and/or are known to the ordinarily skilled artisan. Commonly, such activation temperatures are in the range of 130° C. to 250° C., preferably 150° C. to 200° C., and require a dwell time of between 10 and 90 min, preferably between 15 and 60 min.

Another aspect of the present invention is the use of such thermally expandable compositions for the manufacturing of baffle and/or reinforcement elements. Such elements are used to seal, baffle, and/or reinforce hollow structures, e.g. a cavity in a hollow structural part of an automobile. Hollow parts in cars may include body components (e.g., panels), frame components (e.g., hydroformed tubes), pillar structures (e.g., A, B, C, or D-pillars), bumpers, roofs, or the like.

With regard to activation of the thermally expandable composition according to the present invention when used in automotive manufacturing, it is advantageous to couple the thermal activation of the composition with another process step involving heat treatment. An example for such a process step is electrocoating (cathodic dip painting/coating) of the chassis or car body.

In one preferred embodiment, such a baffle and/or reinforcement element for hollow structures consists essentially of a thermally expandable composition. In this case, it is advantageous to design the shape of the element in a way that it can be easily fitted into and attached to the walls of the hollow structure to be baffled and/or reinforced. Manufacturing is in this case preferably done by injection moulding, punching or stamping, or extrusion through a shape template.

In another preferred embodiment, such a baffle and/or reinforcement element for hollow structures comprises, apart from the thermally expandable composition, a carrier element on which the inventive thermally expandable composition is deposited or attached. Such a design may be more cost-efficient and it may facilitate fixation of the baffle and/or reinforcement element on the walls of the structure to be baffled and/or reinforced, e.g. by incorporation of pins, bolts, or hooks on the carrier element. Furthermore, with a suitable design of the carrier element, the mechanical performance and stability of the baffle and/or reinforcement element according to the present invention can be increased.

Said carrier element may consist of any material that can be processed into a shape useable for an embodiment of the present invention. Preferred materials are polymeric materials, such as a plastic, elastomers, thermoplastics, thermosettable polymers, a blend or other combination thereof, or the like. Preferred thermoplastic materials include, without limitation, polymers such as polyurethanes, polyamides, polyesters, polyolefins, polysulfones, poly(ethylene terephthalates), polyvinylchlorides, chlorinated polyolefins, or the like. Especially preferred are high-temperature stable polymers such as poly(phenyl ethers), polysulfones, polyethersulfones, polyamides, preferably polyamide 6, polyamide 6,6, polyamide 11, polyamide 12, or a mixture thereof. Other suitable materials include metals, especially aluminium or steel, or naturally grown, organic materials, such as wood or other (pressed) fibrous materials. Also glassy or ceramic materials can be used. It is possible to use any combination of such materials. It is also contemplated that such materials can be filled (e.g. with fibres, minerals, clays, silicates, carbonates, combinations thereof or the like) or foamed.

The carrier element can further exhibit any shape or geometry. It can also consist of several, not directly connected parts. For example, it can be massive, hollow, or foamed, or it can exhibit a grid-like structure. The surface of the carrier element can typically be smooth, rough, or structured, according to the intended use of the baffle and/or reinforcement element.

The manufacturing process of a baffle and/or reinforcement element in accordance with the present invention depends largely on the material of the carrier element. If the material of the carrier element can be (injection-) moulded or extruded, the whole baffle and/or reinforcement element can be produced in a two-step injection-moulding process or a co-extrusion process of the carrier element and the thermally expandable composition. If using a two-step injection moulding process, in a first step, material for the carrier element is injected into the mould. After solidification, the cavity of the injection moulding tool is enlarged or adjusted, or the injection-moulded piece is transferred into another tool and the second component, in this case the material for the thermally expandable composition, is injected.

If the carrier element is not shaped by injection-moulding or extrusion, e.g., because it consist of a metal or alloy, it may be first manufactured by a suitable process and then introduced into the injection-moulding tool, and the thermally expandable composition may be injection-moulded into the tool where the carrier element was placed. Another possibility is to extrude the thermally expandable composition onto the pre-fabricated carrier element. Of course there is also the possibility of manufacturing the carrier element and the expandable composition element individually by a suitable process, and then attaching the expandable composition element to the carrier element by any suitable means, such as chemically or physically, e.g. by gluing or the like, or mechanically, e.g. by bolting, screwing, or the like.

Another aspect of the present invention is the use of the baffle and/or reinforcement element as described above to seal, baffle, or reinforce a cavity or hollow structure of a land-, water-, or air-vehicle, preferably an automotive vehicle, and/or a cavity of a building such that the transmission of noise, vibrations, humidity, and/or heat is reduced, and/or the object surrounding said cavity is mechanically strengthened.

A further aspect of the present invention is a method for sealing, baffling and/or reinforcing a cavity or hollow structure, characterised in that an element comprising a thermally expandable composition according as described above is introduced into said cavity or hollow structure and subsequently thermally expanded such that said cavity or hollow structure is at least partially filled by the expanded composition. Preferred temperature for the thermal expansion process is between 130° C. and 250° C.

The invention is further explained in the following experimental part which, however, shall not be construed as limiting the scope of the invention.

Examples

1. Formulation of Example Compositions 1.1 Compositions

The compositions Ex1-Ex12 were prepared according to the procedure shown below. The exact individual compositions in wt.-%, based on the total weight of the individual respective composition, are listed in Table 2.

Details on the ingredients used in the compositions Ex1-Ex12 described herein are listed in Table 1.

TABLE 1

Details on the ingredients and their trade names used in the inventive and non-inventive example compositions in this document.

| Ingredient | Description | Properties or trade name |
|---|---|---|
| Polymer P1 | Ethylene-vinyl acetate (EVA) copolymer resin | EVA with 18 wt.-% vinyl acetate monomer and a melt flow index (MFI) of 150 g/10 min (ATSM D1238) |
| Polymer P2 | Ethylene-vinyl acetate (EVA) copolymer resin | EVA with 28 wt.-% vinyl acetate monomer and a MFI of 6 g/10 min (ATSM D1238) |
| Adhesion promoter | Ethylene-glycidyl methacrylate copolymer (8 wt.-% glycidyl methacrylate) | MFI of 5 g/10 min (ASTM D1238) |
| Tackifier | C5-C9-Hydrocarbon resin | Mn 1100 g/mol, Mw 2000 g/mol, |
| Dispersion aid | Polyethylene wax | Melting point 118° C. (ASTM D3954) |
| Stabilizer | Stabilizer | Irganox 1010 |
| Filler | Calcium carbonate | |
| ZnO | Zinc oxide, Activator | Sigma Aldrich, Switzerland |
| ACDA | Azodicarbonamide | Tramaco, Germany |
| PE | Peroxide, Di-(2-tert.-butyl-peroxyisopropyl)-benzene (40 wt.-%) on calcium carbonate and silica | Pergan, Germany |
| Acrylate | Dipentaerythritol pentaacrylate | Sartomer Arkema |

1.2 Mixing and Moulding Procedure

All inventive and non-inventive example compositions in this document were prepared according to the following procedure:

In a first step, polymer P1 and polymer P2, the adhesion promoter, and the dispersion aid were mixed and melted at 95° C. with a mixing rate of 50 rpm (rounds per minute) during 10 min (minutes). After this, half of the activator amount was added during 1 min and mixing was continued during 4 min at 50 rpm. Mixing was continued at 20 rpm during 5 min until the mixture cooled down to 95° C.

After this, the azodicarbonamide, acrylate, and the second half of the activator amount were added during 1 min, followed by mixing at 50 rpm for 1 min. Finally the peroxide and all the rest were added during 1 min and mixing was continued for 2 min at 50 rpm.

The mixtures were moulded with a temperature of 90° C. and a pressure of 60 bar during 15 s (seconds) into test shapes with a dimension of 25×25×3 mm (millimetres). These test shapes were cooled down to room temperature (23° C.) and used for the subsequently described expansion test experiments.

2 Testing of Example Compositions 2.1 Expansion Stability

Expansion stability was tested in all samples by heat treatment of the individual samples at various temperatures during 30 min in an oven. The temperatures and magnitude of expansion (in % based on the original volume prior to expansion) at the corresponding temperatures are shown in Table 2.

Expansions were quantified for each sample by measuring the density before and after expansion. The densities were determined according to DIN EN ISO 1183 using the water immersion method (Archimedes principle) in deionised water and a precision balance to measure the mass.

The expansion stability can be estimated by comparing the expansion of a sample at different temperatures. Table 2 lists the expansions of the composition samples at 155° C., 160° C., 180° C., and 200° C.

Table 2 furthermore show the molar ratio of the zinc compounds ZC to the peroxide PE "(ZnO:PE)", the molar ratio of azodicarbonamide ADCA to peroxide PE "(ADCA:PE)" and molar ratio of the azodicarbonamide ADCA to the sum of peroxide PE and zinc compound ZC (ADCA:(PE+ZnO)).

2.2 Odor Test

VDA 270

This odor test was performed according to the VDA 270 "Determination of the odor behavior of automotive interior materials" in line with the VDA "Verband der Automobilindustrie" on February 2017. The VDA 270 is for example used by various OEMs, such as Daimler Chrysler, BMW and Porsche. The rating system ranges from Grade 1 "imperceptible" to Grade 6 "unbearable". Square specimens (plaque) with an edge length of 0.4 cm were expanded for 30 min in an oven at 180° C. giving rise to a volume of 50 ccm. The expanded sample was then put into a 1000 ccm container for further analysis.

Ammonia

This odor test was performed by assessing the smell of the foamed samples and rated n=no smell of ammonia, w=weak smell of ammonia, y=strong smell of ammonia, yy=very strong smell of ammonia.

TABLE 2

| Ingredients | Mw | wt.-% | Ex1 | Ex2 | Ex3 | Ex4 | Ex5 | Ex6 | Ex7 | Ex8 | Ex9 | Ex10 | Ex11 | Ex12 |
|---|---|---|---|---|---|---|---|---|---|---|---|---|---|---|
| P1 | | [%] | 30.66 | 31.87 | 32.24 | 31.13 | 31.10 | 31.05 | 30.98 | 30.82 | 29.98 | 31.11 | 31.32 | 31.50 |
| P2 | | [%] | 17.88 | 18.58 | 18.80 | 18.15 | 18.13 | 18.11 | 18.06 | 17.97 | 17.48 | 18.15 | 18.26 | 18.38 |
| Adhesion promoter | | [%] | 14.24 | 14.80 | 14.98 | 14.46 | 14.44 | 14.42 | 14.39 | 14.31 | 13.93 | 14.46 | 14.55 | 14.64 |
| Tackifier | | [%] | 6.08 | 6.32 | 6.40 | 6.17 | 6.17 | 6.16 | 6.14 | 6.11 | 5.95 | 6.17 | 6.21 | 6.25 |
| ZnO | 81.38 | [%] | 3.77 | | | | 0.10 | 0.26 | 0.51 | 1.02 | 3.69 | 0.51 | 0.52 | 0.52 |
| Dispersion aid | | [%] | 5.52 | 5.74 | 5.81 | 5.61 | 5.60 | 5.59 | 5.58 | 5.55 | 5.40 | 5.61 | 5.64 | 5.68 |
| Stabilizer | | [%] | 0.61 | 0.63 | 0.64 | 0.62 | 0.62 | 0.62 | 0.61 | 0.61 | 0.59 | 0.62 | 0.62 | 0.63 |
| Filler | | [%] | 10.14 | 10.53 | 10.66 | 10.29 | 10.28 | 10.26 | 10.24 | 10.19 | 9.91 | 10.29 | 10.35 | 10.42 |
| ACDA | 116.08 | [%] | 8.27 | 8.60 | 8.70 | 8.40 | 8.39 | 8.38 | 8.35 | 8.31 | 8.09 | 8.40 | 8.45 | 8.50 |
| PE | 338.48 | [%] | 2.28 | 2.36 | 1.19 | 4.61 | 4.61 | 4.60 | 4.59 | 4.56 | 4.44 | 4.12 | 3.52 | 2.92 |
| Acrylate | | [%] | 0.55 | 0.57 | 0.58 | 0.56 | 0.56 | 0.55 | 0.55 | 0.55 | 0.54 | 0.56 | 0.56 | 0.56 |
| TOTAL | | [%] | 100.00 | 100.00 | 100.00 | 100.00 | 100.00 | 100.00 | 100.00 | 100.00 | 100.00 | 100.00 | 100.00 | 100.00 |
| RESULTS | | | | | | | | | | | | | | |
| Expansion 30' 160° C. | | [%] | n.d. | n.d. | n.d. | n.d. | n.d. | 1356 | 1740 | 1937 | n.d. | 1862 | n.d. | 2138 |
| Expansion 30' 180° C. | | [%] | 2303 | 607 | 560 | 719 | 1310 | 1908 | 1934 | 2073 | 2270 | 1875 | 2210 | 2308 |
| Expansion 30' 200° C. | | [%] | n.d. | n.d. | n.d. | n.d. | n.d. | 1447 | 1321 | 968 | n.d. | 881 | 1425 | 1402 |
| Odor test | | | | | | | | | | | | | | |
| Rating | | [R] | 4 | 4.33 | 5 | 4.33 | 4 | 3.8 | 3.1 | 3.4 | 5 | 3.4 | 3.1 | 3.7 |
| Ammonia | | [R] | y | y | yy | n | n | n.d. | n | w | y | n | n | w |
| Molar ratio (ZnO:PE) | | | 17.2 | 0.0 | 0.0 | 0.0 | 0.2 | 0.6 | 1.2 | 2.3 | 8.6 | 1.3 | 1.5 | 1.9 |
| Molar ratio (ADCA:PE) | | | 26.5 | 26.6 | 53.3 | 13.3 | 13.3 | 13.3 | 13.3 | 13.3 | 13.3 | 14.9 | 17.5 | 21.2 |
| Molar ratio ADCA:(PE + ZnO) | | | 1.5 | 26.6 | 53.3 | 13.3 | 10.8 | 8.4 | 6.2 | 4.0 | 1.4 | 6.5 | 6.9 | 7.4 | n.d. = not determined

The invention claimed is:

1. A thermally expandable composition, comprising
(a) at least one polymer P, cross-linkable by peroxide, and
(b) at least one acrylate A, and
(c) at least one peroxide PE, and
(d) azodicarbonamide ADCA,
(e) zinc compound ZC,
wherein the molar ratio of the zinc compounds ZC to the peroxide PE is between 0.1 and 6.0,
the molar ratio of the azodicarbonamide ADCA to the peroxide PE is between 5 and 30, and
the molar ratio of the azodicarbonamide ADCA to the sum of peroxide PE and zinc compound ZC (ADCA:(PE+ZC)) is between 6 and 20.

2. The thermally expandable composition according to claim 1, wherein the molar ratio of the zinc compound ZC to the peroxide PE is between 0.1 and 4.0.

3. The thermally expandable composition according to claim 1, wherein the molar ratio of the zinc compound ZC to the peroxide PE is between 0.5 and 2.5.

4. The thermally expandable composition according to claim 1, wherein the molar ratio of the zinc compound ZC to the peroxide PE is between 0.1 and 2.0.

5. The thermally expandable composition of claim 1, wherein the molar ratio of the azodicarbonamide ADCA to the peroxide PE is between 8 and 25.

6. The thermally expandable composition of claim 1, wherein the molar ratio of the azodicarbonamide ADCA to the peroxide PE is between 12 and 25.

7. The thermally expandable composition of claim 1, wherein the zinc compound ZC is selected from at least one of the group consisting of zinc oxide, zinc stearate, zinc bis(p-toluenesulphinate) and zinc bis(benzenesulphinate).

8. The thermally expandable composition of claim 1, wherein the polymer P comprises ethylene-vinyl acetate (EVA), and more than 80 wt-%, of the Polymer P consists of ethylene-vinyl acetate (EVA), based on the total amount of the Polymer P.

9. The thermally expandable composition of claim 1, wherein the acrylate A comprises a polyfunctional acrylate with an acrylate functionality of at least 2 or 3, in an amount of more than 70 wt-%, based on the total amount of the Acrylate A.

10. A baffle and/or reinforcement element for hollow structures, wherein the element comprises a thermally expandable composition according to claim 1.

11. A method comprising sealing, baffling, or reinforcing a cavity or hollow structure of a land-, water-, or air-vehicle, and/or a cavity of a building with the baffle and/or reinforcement element according to claim 10, such that the transmission of noise, vibrations, humidity, and/or heat is reduced, and/or the object surrounding the cavity is mechanically strengthened.

12. A method for sealing, baffling and/or reinforcing a cavity or hollow structure, wherein an element comprising a thermally expandable composition according to claim 1 is introduced into the cavity or hollow structure and subsequently thermally expanded such that the cavity or hollow structure is at least partially filled by the expanded composition.

13. The thermally expandable composition of claim 1, wherein the molar ratio of the azodicarbonamide ADCA to the sum of peroxide PE and zinc compound ZC (ADCA:(PE+ZC)) is between 6.2 and 15.

14. The thermally expandable composition of claim 1, wherein the molar ratio of the azodicarbonamide ADCA to the sum of peroxide PE and zinc compound ZC (ADCA:(PE+ZC)) is between 6 and 12.

15. The thermally expandable composition of claim 1, wherein the molar ratio of the azodicarbonamide ADCA to the sum of peroxide PE and zinc compound ZC (ADCA:(PE+ZC)) is between 6.5 and 12.

\* \* \* \* \*